United States Patent [19]

Scarfi et al.

[11] 3,711,597

[45] Jan. 16, 1973

[54] PROCESS FOR THE RECOVERY OF AMMONIUM SULPHATE FROM IT AQUEOUS SOLUTIONS CONTAMINATED BY ORGANIC SUBSTANCES

[75] Inventors: Alberto Scarfi, Emanuele Gugliotta, both of Siracusa; Aldo Giudice, Lentini Siracusa, all of Italy

[73] Assignee: SINCAT Societa Industriale Catanese S. P. A., Palermo, Italy

[22] Filed: Feb. 23, 1971

[21] Appl. No.: 118,176

[30] Foreign Application Priority Data

Feb. 27, 1970 Italy.................................21252 A/70

[52] U.S. Cl....................................................423/545
[51] Int. Cl....................................................C01c 1/24
[58] Field of Search .................23/120, 119; 423/545

[56] References Cited

UNITED STATES PATENTS 3,468,624   9/1969   Miller et al..............................23/119

FOREIGN PATENTS OR APPLICATIONS

| 163,162 | 5/1921 | Great Britain | 23/120 |
| 183,089 | 7/1922 | Great Britain | 23/120 |
| 1,206,505 | 9/1970 | Great Britain | 23/120 |
| 186,990 | 11/1966 | U.S.S.R. | 23/120 |
| 239,279 | 7/1969 | U.S.S.R. | 23/120 |

*Primary Examiner*—Edward Stern
*Attorney*—Stevens, Davis, Miller & Mosher

[57] ABSTRACT

A process is disclosed for the recovery of ammonium sulphate from its solutions contaminated by organic substances, wherein the ammonium sulphate solution containing the organic impurities is treated by the addition of nitric acid in such a quantity that its concentration in the mother solution of the subsequent evaporation phase does not exceed 15 percent by weight; the solution thus treated being then subjected to evaporation; and the crystallized ammonium sulphate being subsequently separated from the mother solution and from the organic impurities.

8 Claims, No Drawings

PROCESS FOR THE RECOVERY OF AMMONIUM SULPHATE FROM IT AQUEOUS SOLUTIONS CONTAMINATED BY ORGANIC SUBSTANCES

The present invention relates to a process for the recovery of ammonium sulphate from its aqueous solutions contaminated by organic substances. More particularly, the present invention relates to a process for the recovery of ammonium sulphate resulting from the production of acrylonitrile and methacrylonitrile; and still more particularly acrylonitrile obtained by synthesis from propylene, ammonia and air.

The main impurities in the solutions resulting from the said last production are generally organic impurities including acrylonitrile, polyacrylonitrile, formamide, acetonitrile, hydrocyanic acid and its polymers, acrylic acid, and acrylamides.

It is well known that upon evaporation of such solutions there is not only the drawback of the deposition of tarry substances on the equipment and especially on the heat exchanging surfaces, but also the recovered ammonium sulphate remains polluted by these substances.

Thus one object of this invention is that of providing a simple and cheap method for recovering ammonium sulphate of a high degree of purity, while at the same time avoiding clogging the recovery equipment.

Another object of this invention is that of providing a recovery method that will ensure a satisfactory yield of the ammonium sulphate.

These and still other objects are attained by a process that consists in adding to the ammonium sulphate solution, containing the organic impurities, nitric acid in such a quantity that its concentration in the mother solution of the subsequent phase does not exceed 15 percent by weight, in then subjecting the solution thus treated to vaporization, and in then separating the crystallized ammonium sulphate from the mother liquor and from the organic impurities.

In fact, it has surprisingly been found in accordance with the present invention that the presence of nitric acid during the concentration operations brings about the formation of easily separable carbonaceous agglomerates, in as much as these agglomerates show no tendency to adhere to the ammonium sulphate crystals and to the evaporator walls.

The described beneficial action of the $HNO_3$ manifests itself with excellent results at relatively low temperatures, for instance at about 40°C, as well as at relatively high temperatures, such as for instance at about 90°C or at about 120°C (the boiling temperature of the saturated solutions of ammonium sulphate containing 15 percent of $HNO_3$), as well as at intermediate temperatures.

It has proved to be particularly convenient to work at a temperature between 60° and 70°C, that is at the temperatures that are normally developed in the standard vacuum evaporators used in the crystallization of ammonium sulphate.

There takes place simultaneously in these evaporators the insolubilization of the organic substances as well as the crystallization of the ammonium sulphate.

More particularly, the solution from which the ammonium sulphate is to be recovered, and in which the concentration in $(NH_4)_2SO_4$ may vary within wide limits such as up to the saturation concentration (there are preferably used solutions at 30–40 percent by weight of $(NH_4)_2SO_4$ ) and with a content in organic substances, expressed as carbon, generally not exceeding 0.6–1 percent by weight, is treated by the addition of nitric acid in such a quantity that the mother solution, under the operating conditions, has a nitric acid content comprised between 0.5 and 15 percent by weight. In general, it is preferred to keep the nitric acid content between 1 percent and 5 percent. Values higher than 15 percent are not suitable, since under such a condition acid ammonium sulphate precipitates.

If the solution intended for the recovery of $(NH_4)_2SO_4$ turns out to be acid from the start (in general this will be an acidity due to sulphuric acid) before the addition of $HNO_3$, one will neutralize this initial acidity by means of $NH_3$ until a pH between 5 and 6 is reached, but preferably a pH of around 5.5. The ammonia may also be introduced directly during the vaporization stage of the process. Due to the high solubility of the resulting nitrate, there is no danger of its contaminating the crystallized ammonium sulphate.

The solution thus treated with nitric acid is then subjected to evaporation, for instance in a continuous way under vacuum at 65°C. During the evaporation, the organic substances precipitate in the form of carbonaceous particles of just a few tenths of a millimeter in size, and these are uniformly diffused throughout the solution.

The crystallized ammonium sulphate is then separated from the solution and from the organic impurities by per se known methods such as for instance by centrifuging.

The ammonium sulphate thus separated is successively washed in the same centrifuge with water in quantities between 5 and 20 percent (preferably about 10 percent) with respect to the salt, which is then suitably dried, for instance, at 90°C.

The yield of ammonium sulphate turns out to be greater than 90 percent when the content in organic impurities does not exceed 0.2 percent (always expressed as carbon).

The mother liquor and the wash waters are recycled back into the concentration phase. When the content of organic substances in the $(NH_4)_2SO_4$ solution at the inlet is quite high (greater than 0.6 percent of C) it will be necessary, before re-cycling, to subject the recycle water to filtration in order to free it of the organic impurities in suspension.

Due to this recycling, the concentration of the organic substances in the mother liquor tends to increase. Since in general it is not convenient to permit this concentration, under operational conditions, to exceed the value of about 2 percent in order to hinder or prevent an excessive accumulation of impurities, part of the mother solution must be discharged from the circuit. In general there are discharged from 3 percent to 30 percent, but preferably from 5 to 10 percent, of the mother liquor, expressed as $(NH_4)_2SO_4$ participating in the processing.

In the case of solutions having at the inlet a high content in organic substances, for instance a content between 0.6 and 1.0 percent, it would become necessary to carry through a considerable discharge of mother solution, with a consequential lowering of the yield in ammonium sulphate. In order to maintain the yield and at the same time to obtain a fairly well purified ammonium sulphate, it is preferred to maintain the content in carbon in the mother liquor at a higher value (up to about 2.5 – 3 percent), and to purify the crystallized $(NH_4)_2SO_4$ not by simply washing it in a centrifuge but by double centrifugation, mixing the salt coming from the first centrifugation with small quantities of water. The ammonium sulphate coming from the first centrifugation can also be kneaded with water and thereafter subjected to a second centrifuging. Since the organic substances contained in the mother solution are partly dissolved and partly undissolved in the form of carbonaceous agglomerates, from the intermediate mixture of salt and water between the first and the second centrifugation it is also possible to remove the undissolved organic substances from the salt by desliming.

In order still better to illustrate the invention, some illustrative non-limiting examples are given:

EXAMPLE 1

In the following test all quantities, for the sake of convenience, are referred to 100 g of solution of $(NH_4)_2SO_4$ which enters the cycle. All percentage values are percentages by weight.

A solution containing 30 percent of $(NH_4)_2SO_4$ and organic substances in quantities equal to 0.2 percent, expressed as carbon, and coming from the production of acrylonitrile from propylene, ammonia and air, was evaporated by a continuous process, under vacuum at 60°–65C, in an indirect heat-exchanging apparatus.

To 100.000 g of this solution were then added 0.156 g of $HNO_3$ calculated as 100 percent. The quantity of $HNO_3$ added to the solution is such that, under operational conditions, there was produced in the evaporated mother solution a concentration of $HNO_3$ equal to 3 percent while the concentration of the organic substances rose to 1.6 percent.

Thereupon there were evaporated 70.113 g of water containing under operational conditions 0.112 g of organic substances expressed as carbon and 0.001 g of $HNO_3$. The crystallized salt was then centrifuged and washed in the centrifuge with 2.767 g of water, whereupon the wash waters were re-cycled. From the circuit were discharged 5.155 g of mother solution containing, under operational conditions, 2.350 g of $(NH_4)_2SO_4$, 0.083 g of organic substances expressed as carbon, and 0.155 g of $HNO_3$.

After drying at 90°C, there were obtained 27.655 g of $(NH_4)_2SO_4$ of a white color and with 20–21 percent nitrogen, containing 0.005 g of organic substances expressed as carbon (0.018 percent of C).

The yield of $(NH_4)_2SO_4$ = 92.17 percent.

EXAMPLE 2

A solution containing 34 percent of $(NH_4)_2SO_4$ and organic substances in quantities equal to 0.2 percent expressed as carbon, and coming from the same production as that mentioned in Example 1, was evaporated under vacuum at 60° – 65°C by a continuous process.

To 100.000 g of this solution were then added 0.168 g of $HNO_3$ and 0.015 g of $NH_3$. In this way, there was established in the mother solution, under operational conditions, a concentration in $HNO_3$ of 3 percent, of which one third appeared in the form of $NH_4NO_3$, while the concentration of the organic substances rose to 1.6 percent.

Thereafter there were evaporated 66.294 g of water containing, under operational conditions, 0.106 g of carbon and 0.001 g of $HNO_3$. The crystallized salt was centrifuged and then washed in the centrifuge with 3.147 g of water and the wash waters were then re-cycled. There were discharged from the circuit 5.558 g of mother solution containing, under operational conditions, 2.527 g of $(NH_4)_2SO_4$, 0.089 g of carbon, 0.111 g of $HNO_3$ and 0.071 g of $NH_4NO_3$. After drying at 90°C, there were obtained 31.478 g of $(NH_4)_2SO_4$, of a white color and with 20 – 21 percent of nitrogen, and containing 0.005 g of carbon (0.016 g of carbon).

The yield of $(NH_4)_2SO_4$ = 92.57 percent.

EXAMPLE 3

A solution containing 30 percent of $(NH_4)_2SO_4$ and organic substances in quantities equal to 0.2 percent, expressed as carbon, and coming from the same production as that mentioned in the preceding examples, was evaporated by a continuous process under vacuum at 60° – 65°C.

To 100.000 g of this solution were then added 0.514 g of $HNO_3$. This solution was then evaporated in such a way as to bring about in the mother solution, under operational conditions, a concentration of $HNO_3$ equal to 10 percent, while the concentration in organic substances rose to 1.6 percent.

70.599 g of water then evaporated which, under operational conditions, contained 0.113 g of carbon and 0.003 g of $HNO_3$. The crystallized salt was then centrifuged and successively washed in the centrifuge with 2.756 g of water, after which the wash waters were recycled.

From the circuit were discharged 5.106 g of mother solution containing, under operational conditions, 2.440 g of $(NH_4)_2SO_4$, 0.082 g of carbon and 0.511 g of $HNO_3$. After drying at 90°C, there were obtained 27.565 g of a white $(NH_4)_2SO_4$ having 20–21 percent of nitrogen, and containing 0.005 g of carbon (0.018 percent of carbon).

The yield in $(NH_4)_2SO_4$ was equal to 91.87 percent.

EXAMPLE 4

A solution containing 30 percent of $(NH_4)_2SO_4$ and organic substances in quantities equal to 0.35 percent, expressed as carbon, and coming from the same production as that mentioned in the preceding examples, was continuously evaporated under vacuum at 60° – 65°C.

To 100.000 g of this solution were then added 0.312 g of $HNO_3$. The solution was then evaporated in such a way as to obtain in the mother solution, under operational conditions, a concentration of $HNO_3$ equal to 3 percent, while the concentration of the organic substances grew to 1.9 percent.

There were evaporated 67.219 g of water containing, under operational conditions, 0.148 g of carbon and 0.001 g of $HNO_3$, and the crystallized salt was centrifuged and then washed in the centrifuge with 2.520 g of water. The wash waters were re-cycled to the evaporation stage, and from the circuit were discharged 10.352 g of mother solution containing, under operational conditions, 4.744 g of $(NH_4)_2SO_4$, 0.197 g of carbon and 0.311 g of $HNO_3$, and, after drying, there were obtained 25.261 g of $(NH_4)_2SO_4$ of a white color and having 20 – 21 percent of nitrogen, and containing 0.005 g of carbon (0.020 percent of carbon).

The yield of $(NH_4)_2SO_4$ amounted to 84.19 percent.

EXAMPLE 5

A solution containing 27 percent of $(NH_4)_2SO_4$ and organic substances in quantities equal to 0.6 percent, expressed as carbon, and coming from the same production as that indicated in the preceding examples, was evaporated in a continuous process under vacuum at 60°–65°C.

To 100.000 g of this solution were then added 0.623 g of $HNO_3$ so as to obtain, under operational conditions, in the mother solution a concentration of $HNO_3$ equal to 5 percent, while the concentration of the organic substances rose to 2.7 percent.

There were evaporated 70.079 g of water containing, under operational conditions, 0.259 g of carbon and 0.002 g of $HNO_3$, and the crystallized salt was then centrifuged and successively washed in the centrifuge with 3.200 g of water. The wash waters were then re-cycled back to the evaporation stage and from the circuit were discharged 12.408 g of mother solution containing, under operational conditions, 5.670 g of $(NH_4)_2SO_4$, 0.335 g of carbon and 0.621 g of $HNO_3$. After drying there were obtained 21.336 g of $(NH_4)_2SO_4$ of a white color and having 20–21 percent of nitrogen, and containing 0.006 g of carbon (0.028 percent of carbon).

The yield of $(NH_4)_2SO_4$ amounted to 79.00 percent.

The nitric acid chemical action has not been found out so far; anyhow it has been ascertained to be of the utmost importance that the concentration takes place in acid environment due to nitric acid; the simple heat treatment of the solution with $HNO_3$ does not cause any effect: in fact, when the solution is hot-treated with $HNO_3$ and neutralized with $NH_3$ before concentrating it, the organic impurities pollute both the ammonium sulphate and the apparatuses.

What is claimed is:

1. A process for the recovery of ammonium sulphate from its solutions contaminated by organic substances, wherein the ammonium sulphate solution containing the organic impurities is treated by the addition of nitric acid in such a quantity that its concentration in the mother solution of the subsequent evaporation phase does not exceed 15% by weight; the solution thus treated is subjected to evaporation at temperatures ranging between 40° and 120°C; and the crystallized ammonium sulphate is subsequently separated from the mother solution and from the organic impurities which precipitate in the form of carbonaceous agglomerates having no tendency to adhere to the ammonium sulphate crystals and to the equipment.

2. A process according to claim 1, wherein the concentration in $HNO_3$ of the mother solution has a value between 0.5 percent and 15 percent by weight.

3. A process according to claim 1, wherein the concentration in $HNO_3$ of the mother solution has a value between 1 percent and 5 percent by weight.

4. A process according to claim 1, wherein the crystallized ammonium sulphate is separated from the mother solution and from the organic impurities by centrifuging.

5. A process according to claim 1, wherein, in the case of $(NH_4)_2SO_4$ solutions having at the inlet a content in organic substances greater than 0.6 percent by weight expressed as carbon, the mother liquor coming from the centrifugation as well as the wash waters are subjected to filtration before recycling into the concentration stage, in order to purify them from the organic impurities present in them in suspension.

6. A process according to claim 1, wherein, in the case of $(NH_4)_2SO_4$ solutions having at the inlet a content of organic substances greater than 0.6 percent by weight expressed as carbon, the ammonium sulphate is subjected to a double centrifugation and between the first and the second centrifugation it is kneaded with water.

7. A process according to claim 1, wherein, in the case in which the ammonium sulphate solution at the inlet is an acid solution, the acidity is first neutralized with $NH_3$ to a pH of from 5 to 6.

8. A method according to claim 1, wherein the recycling mother liquor is discharged from the circuit in quantities ranging between 3 and 30 percent, expressed as $(NH_4)_2SO_4$, participating in the processing.

* * * * *